(12) United States Patent
Flordal et al.

(10) Patent No.: US 10,395,394 B2
(45) Date of Patent: Aug. 27, 2019

(54) ENCODING AND DECODING ARRAYS OF DATA ELEMENTS

(71) Applicant: ARM Limited, Cambridge (GB)

(72) Inventors: Lars Oskar Flordal, Uppsala (SE); Jakob Axel Fries, Malmö (SE); Toni Viki Brkic, Staffanstorp (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/610,016

(22) Filed: May 31, 2017

(65) Prior Publication Data

US 2017/0352165 A1 Dec. 7, 2017

(30) Foreign Application Priority Data

Jun. 3, 2016 (GB) .................................. 1609746.1

(51) Int. Cl.
*G06K 9/46* (2006.01)
*G06T 9/40* (2006.01)
(Continued)

(52) U.S. Cl.
CPC .................. *G06T 9/40* (2013.01); *G06T 9/00* (2013.01); *G06T 15/005* (2013.01); *G09G 5/39* (2013.01); *H04N 19/11* (2014.11); *H04N 19/15* (2014.11); *H04N 19/176* (2014.11); *H04N 19/182* (2014.11); *H04N 19/186* (2014.11); *H04N 19/96* (2014.11); *G09G 2340/02* (2013.01); *G09G 2350/00* (2013.01); *G09G 2360/12* (2013.01)

(58) Field of Classification Search
None
See application file for complete search history.

(56) References Cited

U.S. PATENT DOCUMENTS 5,708,511 A * 1/1998 Gandhi .................. H04N 19/50
375/E7.088
5,917,952 A * 6/1999 Noh ........................ H04N 1/411
358/1.2

(Continued)

FOREIGN PATENT DOCUMENTS

EP 0782341 A2 7/1997
GB 2339989 2/2000

OTHER PUBLICATIONS

GB Search Report dated Nov. 21, 2016, GB Patent Application GB1609746.1.

*Primary Examiner* — Jayesh A Patel
(74) *Attorney, Agent, or Firm* — Vierra Magen Marcus LLP

(57) ABSTRACT

A method of encoding a block of an array of data elements comprises selectively writing out an encoded version of the block either that is encoded using a first encoding scheme, which provides encoded blocks of non-fixed data size, or that is encoded using a second encoding scheme, which provides encoded blocks of fixed data size. The selection of which version of the encoded block to write out is based on the size of the encoded block when encoded using the first encoding scheme. This provides the potential for the encoded block that is written out to be compressed in a more superior manner using the first encoding scheme where possible, while also providing an encoded block that has a predictable maximum compressed size.

18 Claims, 6 Drawing Sheets

(51) Int. Cl.
  *H04N 19/11*     (2014.01)
  *H04N 19/176*    (2014.01)
  *H04N 19/182*    (2014.01)
  *H04N 19/186*    (2014.01)
  *H04N 19/96*     (2014.01)
  *G06T 15/00*     (2011.01)
  *G09G 5/39*      (2006.01)
  *G06T 9/00*      (2006.01)
  *H04N 19/15*     (2014.01)

(56) References Cited

U.S. PATENT DOCUMENTS

| | | | | |
|---|---|---|---|---|
| 6,198,850 B1 * | 3/2001 | Banton | ................... | H04N 1/41 |
| | | | | 358/426.02 |
| 6,571,018 B1 * | 5/2003 | Kim | ................ | G06T 9/005 |
| | | | | 128/922 |
| 2002/0097917 A1 * | 7/2002 | Nelson | ................ | G06T 9/00 |
| | | | | 382/239 |
| 2005/0120094 A1 * | 6/2005 | Tuli | ................ | H04M 1/72527 |
| | | | | 709/217 |
| 2007/0076966 A1 * | 4/2007 | Lee | ................ | H04N 1/41 |
| | | | | 382/239 |
| 2007/0098283 A1 * | 5/2007 | Kim | ................ | H04N 19/176 |
| | | | | 382/239 |
| 2007/0206867 A1 | 9/2007 | Tamura | | |
| 2007/0206868 A1 * | 9/2007 | Nakayama | ........... | H04N 19/176 |
| | | | | 382/232 |
| 2007/0286507 A1 * | 12/2007 | Mori | ................ | G06K 9/00456 |
| | | | | 382/239 |
| 2011/0164678 A1 | 7/2011 | Date | | |
| 2013/0034309 A1 | 2/2013 | Nystad | | |
| 2013/0195352 A1 | 8/2013 | Nystad | | |

\* cited by examiner

ENCODING AND DECODING ARRAYS OF DATA ELEMENTS

BACKGROUND

The technology described herein relates to a method of and apparatus for encoding an array of data elements. It also relates to the corresponding decoding method and apparatus.

It is common to encode arrays of data elements, such as arrays of graphics data values (e.g. frames for display or graphics textures), so as to compress the data in order to reduce bandwidth and memory consumption. This is particularly desirable in data processing apparatus, e.g. of portable devices, where processing resources and processing power may be limited.

Arrays of data elements are often divided into smaller blocks of data elements and then encoded or decoded on a block by block basis. This can allow partial updating of, or random access to, data elements of the encoded array without needing to encode or decode the entire array each time a data element needs to be updated or accessed. This is particularly the case, for example, in graphics processing apparatus where partial updating of a frame or random access into a texture may be desired.

Some encoding schemes are lossy. For example, the encoding process leads to a reduction in the precision of the data elements of the array being encoded that cannot be recovered when decoding the encoded data. The degree to which these lossy encoding schemes compress the data may be independent of the content of the array and so the size of the resultant encoded blocks may be fixed for these schemes. For example, in encoding schemes that comprise reducing the number bits used to represent each data element in the block, the amount of compression will be fixed by the number of bits that are removed. However, the resultant loss of precision when using these "fixed" encoding schemes is often undesirable in that it can adversely affect the quality of a desired output. For example, with graphics data, a loss of precision can adversely affect the appearance of the graphics output.

For the purposes of the present disclosure, an encoding scheme that provides encoded blocks of fixed data size (a "fixed" encoding scheme) may be an encoding scheme for which, for plural blocks having the same array size (e.g. in terms of number of data elements) but having different data content (e.g. in terms of data values for the data elements), the data size of the encoded versions of those blocks (e.g. in terms of bits or bytes) that are provided when using that encoding scheme is the same.

Other encoding schemes are substantially lossless. For example, the original precision of the data elements of the array being encoded can be substantially recovered when decoding the encoded data. However, in lossless encoding schemes, the degree to which an array of data elements can be compressed may be dependent on the content of the array and so the size of the resultant encoded blocks may not be fixed for these schemes. For example, blocks of substantially uniform data values tend to compress well, whereas blocks of highly varied data values tend not to compress so well. Thus, in the case of graphics data, blocks of substantially uniform appearance (e.g. substantially uniform colour) tend to compress well, whereas blocks of highly varied appearance tend not to compress so well.

Therefore, for some blocks of data, a large amount of compression can be achieved when using these "non-fixed" encoding schemes. However, for other blocks of data, little or no compression can be achieved when using non-fixed encoding schemes. Indeed, in some extreme cases, non-fixed encoding schemes may even increase the amount of data that needs to be stored for a given block. This can increase memory and bandwidth consumption and waste processing power. Non-fixed encoding schemes can also lead to unpredictable memory use, which can require relatively more complex bandwidth and memory management schemes.

For the purposes of the present disclosure, an encoding scheme that provides encoded blocks of non-fixed data size (a "non-fixed" encoding scheme) may be an encoding scheme for which, for plural blocks having the same array size (e.g. in terms of number of data elements) but having different data content (e.g. in terms of data values for the data elements), the data size of the encoded versions of those blocks (e.g. in terms of bits or bytes) that are provided when using that encoding scheme is not the same.

The Applicants believe that there remains scope for improved arrangements for encoding and decoding arrays of data elements.

BRIEF DESCRIPTION OF THE DRAWINGS

Various embodiments of the technology described herein will now be described by way of example only and with reference to the accompanying drawings, in which.

Figure 1:
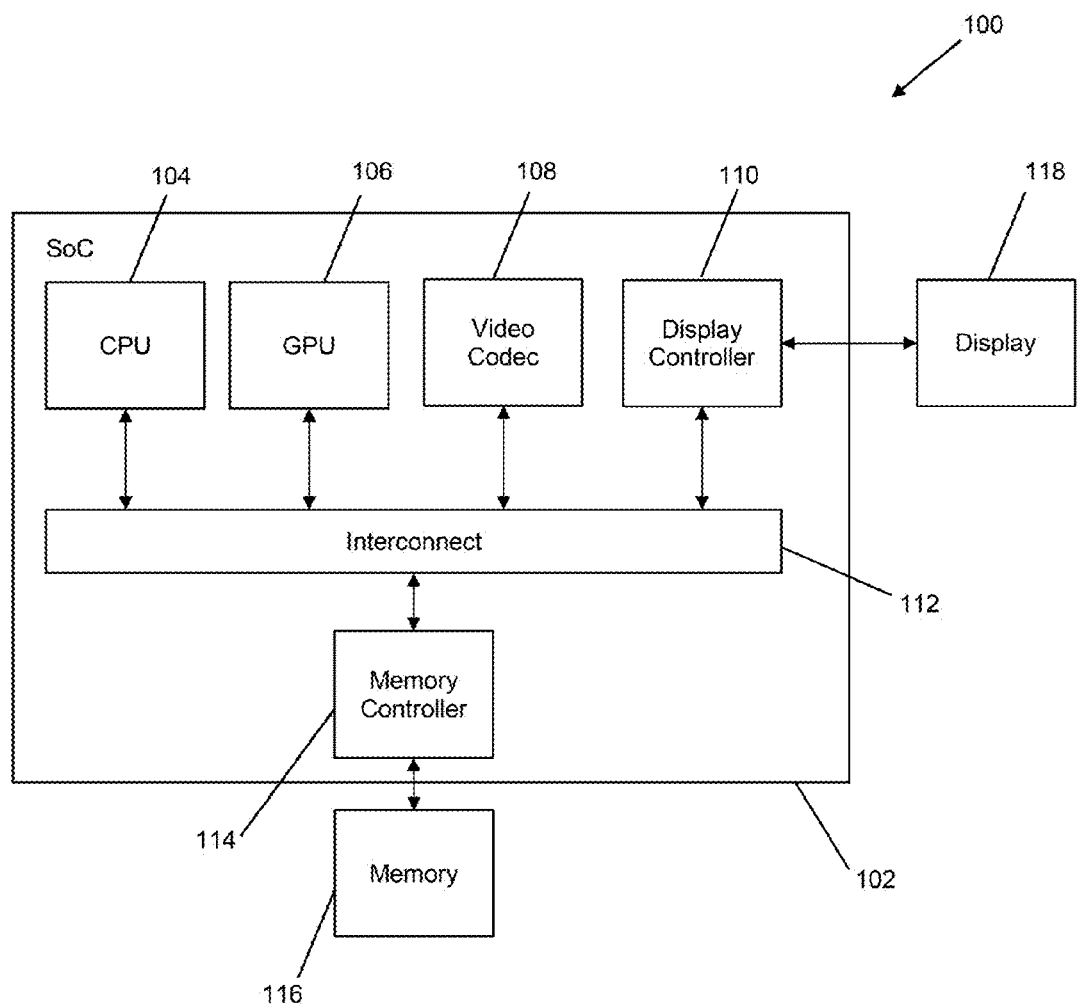
FIG. 1 shows schematically a data processing system according to an embodiment of the technology described herein.

The drawings show elements of a data processing apparatus and system that are relevant to embodiments of the technology described herein. As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings.

DETAILED DESCRIPTION

An embodiment of the technology described herein comprises a method of encoding an array of data elements, the method comprising:

for a block of an array of data elements, determining whether a data size for an encoded version of the block provided when encoding the block using a first encoding scheme is less than or greater than a threshold size;

when the data size for the encoded version of the block is determined to be less than the threshold size, writing out an encoded version of the block that has been encoded using the first encoding scheme; and when the data size for the encoded version of the block is determined to be greater than the threshold size, writing out an encoded version of the block that has been encoded using a second encoding scheme;

wherein the first encoding scheme provides encoded blocks of non-fixed data size and wherein the second encoding scheme provides encoded blocks of fixed data size.

Another embodiment of the technology described herein comprises a data processing apparatus for encoding an array of data elements, the apparatus comprising:

encoding circuitry configured to:
for a block of an array of data elements, determine whether a data size for an encoded version of the block provided when encoding the block using a first encoding scheme is less than or greater than a threshold size; and write control circuitry configured to:
when the data size for the encoded version of the block is determined by the encoding circuitry to be less than the threshold size, write out an encoded version of the block that has been encoded using the first encoding scheme; and
when the data size for the encoded version of the block is determined by the encoding circuitry to be greater than the threshold size, write out an encoded version of the block that has been encoded using a second encoding scheme;
wherein the first encoding scheme provides encoded blocks of non-fixed data size and wherein the second encoding scheme provides encoded blocks of fixed data size.

Thus, in the technology described herein, an encoded version of a block that is encoded either using a first encoding scheme (which provides encoded blocks of non-fixed data size) or using a second encoding scheme (which provides encoded blocks of fixed data size) is selectively written out. The selection of which version of the encoded block to write out is based on the size of the encoded block when encoded using the first encoding scheme. This provides the potential for the encoded block that is written out to be compressed in a more superior (e.g. lossless and/or more compressed) manner using the first encoding scheme where that encoding scheme would result in a suitable compressed block (i.e. that is less than the threshold size), whilst providing an encoded block that has a predictable maximum compressed size. This can lead to predictable maximum bandwidth and memory consumption and can simplify bandwidth and memory management.

In embodiments, the first encoding scheme may be substantially lossless (or at least may be less lossy than the second encoding scheme) and/or the second encoding scheme may be lossy. These embodiments allow the encoded block that is written out to be compressed in a substantially lossless (or less lossy) manner where possible using the first encoding scheme, e.g. so as substantially to maintain the precision of the data elements of that block, but again can allow the encoded block that is written out to have a predictable maximum compressed block size. Whilst these embodiments may mean that the block may be compressed in a lossy (or more lossy) manner using the second encoding scheme, this is generally considered acceptable since, as discussed above, blocks that do not tend to compress so well using non-fixed encoding schemes also tend to comprise more highly varied data elements, such that a reduction in the precision of the data elements upon using a lossy (or more lossy) second encoding scheme may not be so noticeable for the block.

Furthermore, in embodiments, the first encoding scheme may have the potential to compress a block to a greater extent than the second encoding scheme. (However, as will be appreciated, for some blocks (e.g. comprising highly varied data elements), the second encoding scheme may, in fact, compress a block to a greater extent than the first encoding scheme.) These embodiments can allow the encoded block that is written out potentially to be compressed in a more highly compressed manner using the first encoding scheme where possible, e.g. so as to reduce memory and bandwidth usage, but again can allow the encoded block that is written out to have a predictable maximum compressed block size.

The array of data elements may take any desired and suitable form. For example, the array of data elements may correspond to an array of (e.g. graphics) data positions (e.g. sampling positions). The array of data elements or positions may correspond to all or part of a desired (e.g. graphics) output, such as a frame or texture. There may be any desired and suitable correspondence between the data elements or positions and the desired output. Thus, the data elements or positions of the array may each correspond to a pixel or pixels of a frame or to a texel or texels of a texture.

The array of data elements can be any desired and suitable size or shape in terms of data elements or positions, for example rectangular (including square).

The block of the array of data elements can also be any desired and suitable size or shape in terms of data elements or positions, for example rectangular (including square). For example, the block may be 4×4 data elements or positions in size.

The block of the array of data elements may be one of plural blocks that the array of data elements is divided into for encoding purposes. Thus, the method may comprise dividing the array of data elements into plural blocks of data elements. Similarly, the encoding circuitry may be configured to divide the array of data elements into plural blocks of data elements. The plural blocks of data elements may be non-overlapping and/or may be similar or identical in size or shape. The array of data elements can be any desired and suitable size or shape in terms of such blocks.

The data elements may also have any desired and suitable format. For example, the format may represent a single (e.g. graphics) data value (e.g. R, G, B, Y, U, V, α, etc.). Alternatively, the format may represent plural (e.g. graphics) data values (e.g. RGB, RGBα, YUV, YUVα, etc.). The format may, for example, comprise 8 bits per data value. The format may, for example, comprise 24 or 32 bits per data element. The format may be, for example, RGB888 or RGBX8.

As will be appreciated, the data size of the (original unencoded) block is dependent both on the block size in terms of data elements and particular format used for the data elements of the block. The data size may be defined in any desired and suitable way, such as by a number of bits or bytes. For example, for a block that is 4×4 data elements in size and that has 24 or 32 bits per data element, the data size of the block would be, respectively, 48 bytes (i.e. [4×4×24]/8) or 64 bytes (i.e. [4×4×32]/8).

The threshold size may be any desired and suitable size, for example at least less than the size of the (original unencoded) block. The threshold size may be defined in any desired and suitable way, such as by a number of bits or bytes.

In embodiments, the threshold size is substantially the size of an encoded version of a block provided when encoding a block using the second encoding scheme. This can mean, for example, that the maximum compressed block size for an encoded version of the block that is written out is fixed by the particular second encoding scheme being used. This can in turn mean, for example, that the array of data elements can be encoded in such a way so as to comply with certain (e.g. API) protocols.

Determining whether the data size is less than or greater than the threshold size may be achieved in any desired and suitable way.

In embodiments, determining whether the data size is less than or greater than the threshold size may comprise generating the encoded version of the block using the first encoding scheme and then comparing the data size of that encoded version of the block to the threshold size. Thus, when determining whether the data size is less than or greater than the threshold size, the encoding circuitry may be configured to generate the encoded version of the block using the first encoding scheme and then compare the data size of that encoded version of the block to the threshold size.

In these embodiments, an encoded version of the block may be generated using the second encoding scheme substantially at the same time as generating the encoded version of the block using the first encoding scheme. It has been identified that these embodiments can, for example, make use of data for the block that is readily available (e.g. cached), thereby reducing the overall amount of processing resources and processing time needed to generate the encoded version of the block using the second encoding scheme, should it be needed. Thus, the method may comprise generating the encoded version of the block using the second encoding scheme substantially at the same time as generating the encoded version of the block using the first encoding scheme. Similarly, the encoding circuitry may be configured to generate the encoded version of the block using the second encoding scheme substantially at the same time as generating the encoded version of the block using the first encoding scheme.

In other embodiments, an encoded version of the block may be generated using the second encoding scheme only once the data size is determined to be greater than the threshold size. These embodiments can, for example, avoid the need to generate the encoded version of the block using the second encoding scheme unless that encoded version is needed. Thus, the method may comprise generating the encoded version of the block using the second encoding scheme once the data size is determined to be greater than the threshold size. Similarly, the encoding circuitry may be configured to generate the encoded version of the block using the second encoding scheme once the data size is determined to be greater than the threshold size.

In other embodiments, determining whether the data size is less than or greater than the threshold size may comprise predicting the data size (e.g. prior to or without generating the encoded version of the block using the first encoding scheme). Thus, when determining whether the data size is less than or greater than the threshold size, the encoding circuitry may be configured to predict the data size (e.g. prior to or without generating the encoded version of the block using the first encoding scheme). The prediction may, for example, be based on any desired and suitable (e.g. statistical) property of or for the data elements of the (original unencoded) block.

As discussed above, when the data size is determined to be less than the threshold size, the encoded version of the block that has been encoded using the first encoding scheme is written out.

In this case, an encoded version of the block that has been encoded using the second encoding scheme may not be written out. Thus, when the data size is determined to be less than the threshold size, the encoding circuitry and/or write control circuitry may be configured not to write out an encoded version of the block that has been encoded using the second encoding scheme. For example, an encoded version of the block that has been encoded using the second encoding scheme may not be generated or, if generated, the encoded version of the block that has been encoded using the second encoding scheme may be discarded. Thus, the encoding circuitry may be configured not to generate an encoded version of the block using the second encoding scheme or, if generated, the write control circuitry may be configured to discard the encoded version of the block that has been encoded using the second encoding scheme.

On the other hand, as discussed above, when the data size is determined to be greater than the threshold size, the encoded version of the block that has been encoded using the second encoding scheme is written out.

In this case, an encoded version of the block that has been encoded using the first encoding scheme may not be written out. Thus, when the data size is determined to be greater than the threshold size, the encoding circuitry and/or write control circuitry may be configured not to write out an encoded version of the block that has been encoded using the first encoding scheme. For example, an encoded version of the block that has been encoded using the first encoding scheme may not be generated or, if generated, the encoded version of the block that has been encoded using the first encoding scheme may be discarded. Thus, the encoding circuitry may be configured not to generate an encoded version of the block using the first encoding scheme or, if generated, the write control circuitry may be configured to discard the encoded version of the block that has been encoded using the first encoding scheme.

As will be appreciated, either an encoded version of the block that has been encoded using the first encoding scheme or an encoded version of the block that has been encoded using the second encoding scheme may be written out when the data size is determined to be neither less than nor greater than (i.e. equal to) the threshold size. However, in embodiments, when the data size is determined to be equal to the threshold size, an encoded version of the block that has been encoded using the first (e.g. more superior) encoding scheme is written out. Thus, in embodiments, when the data size is determined to be equal to the threshold size, the write out circuitry is configured to write out an encoded version of the block that has been encoded using the first encoding scheme.

The first encoding scheme can take any desired and suitable form in which encoded blocks of non-fixed data size are provided, e.g. in which the data size of a given encoded version of a block is dependent on the particular data values represented by the data elements of that block.

In embodiments, the first encoding scheme may comprise an entropy encoding scheme or difference encoding scheme. In these embodiments, generating an encoded version of the block using the first encoding scheme may comprise determining a (e.g. the lowest) data value for the block and the differences between that data value and corresponding data values for each of the data elements of the block. Thus, when generating an encoded version of the block using the first encoding scheme, the encoding circuitry may be configured to determine a (e.g. the lowest) data value for the block and the differences between that data value and corresponding data values for each of the data elements of the block.

The encoded version of the block that has been encoded using the first encoding scheme may therefore comprise a (e.g. lowest) data value for the block and a set of differences between that data value and corresponding data values for each of the data elements of the block.

A (e.g. lowest) data value and a set of differences between that data value and corresponding data values for each of the data elements of the block may be determined and provided for each type of data value (e.g. R, G, B, a) represented by the data elements of the block.

In embodiments, the first encoding scheme may comprise an encoding scheme substantially as described in US 2013/0034309 or US 2013-0195352, the entire contents of which are incorporated herein by reference.

Similarly, the second encoding scheme can take any desired and suitable form in which encoded blocks of fixed data size are provided, e.g. in which the data size of a given encoded version of a block is independent of the particular data values represented by the data elements of that block.

In embodiments, the second encoding scheme may comprise converting the data elements of the block to a different (e.g. lower precision) format. Similarly, when generating an encoded version of the block using the second encoding scheme, the encoding circuitry may be configured to convert the data elements of the block to a different (e.g. lower precision) format.

For example, when generating an encoded version of the block using the second encoding scheme, the method may comprise reducing the number of bits used to represent the data elements of the block. Thus, when generating an encoded version of the block using the second encoding scheme, the encoding circuitry may be configured to reduce the number of bits used to represent the data elements of the block. Reducing the number of bits may comprise removing or discarding one or more bits of the data elements of the block, such as one or more (e.g. the least significant) bits of a or each data value for the data element.

In embodiments, the second encoding scheme may further comprise applying dither to the data elements of the block. Thus, when generating an encoded version of the block using the second encoding scheme, the encoding circuitry may be further configured to apply dither to the data elements of the block. The dither may be applied prior to converting the data elements of the block to a different (e.g. lower precision) format. The process of applying dither to the data elements of the block may comprise applying noise to the data values represented by the data elements of the block, for example so as to randomise quantisation error. These embodiments may, therefore, help to lessen the (e.g. visual) impact that the second encoding scheme may have on the quality (e.g. appearance) of a desired (e.g. graphics) output for blocks that are encoded using the second encoding scheme.

In contrast to embodiments of the second encoding scheme, since the first encoding scheme may be lossless, or at least less lossy, the first encoding scheme need not comprise applying dither to the data elements of a block. This can, for example, avoid the (e.g. visual) impact that dithering could have on the quality (e.g. appearance) of a desired (e.g. graphics) output for blocks that are encoded using the first encoding scheme.

The data elements of the encoded version of the block that has been encoded using the second encoding scheme may take any desired and suitable format. For example, the format may represent a single (e.g. graphics) data value (e.g. R, G, B, Y, U, V, a, etc.). Alternatively, the format may represent plural (e.g. graphics) data values (e.g. RGB, RGBa, YUV, YUVa, etc.). The format may, for example, comprise 5 or 6 bits per data value. The format may, for example, comprise 16 bits per data element. The format may be, for example, RGB565.

As will be appreciated, the fixed data size of encoded versions of blocks provided when using the second encoding scheme is dependent both on the encoded block size in terms of data elements and the particular format used for the data elements of the encoded blocks. The fixed data size may be defined in any desired and suitable way, such as by a number of bits or bytes. For example, for encoded blocks that are 4×4 data elements in size and that have 16 bits per data element, the fixed data size would be 32 bytes (i.e. [4×4× 16]/8). As discussed above, this fixed data size may be used as the threshold size.

As discussed above, the technology described herein comprises writing out an encoded version of the block either that has been encoded using the first encoding scheme or that has been encoded using the second encoding scheme. This may comprise writing out the encoded version of the block to memory.

Thus, writing out an encoded version of the block that has been encoded using the first encoding scheme may comprise writing out that encoded version of the block to memory. Similarly, the write control circuitry may be configured to, when writing out an encoded version of the block that has been encoded using the first encoding scheme, write out that encoded version of the block to memory.

Also, writing out an encoded version of the block that has been encoded using the second encoding scheme may comprise writing out that encoded version of the block to memory. Similarly, the write control circuitry may be configured to, when writing out an encoded version of the block that has been encoded using the second encoding scheme, write out that encoded version of the block to memory.

Accordingly, the apparatus, or a system that comprises the apparatus, may comprise a memory controller configured to store encoded blocks of an array of data elements in memory and/or may comprise a memory configured to store encoded blocks of an array of data elements.

In embodiments, the method may further comprise writing out metadata (e.g. a bit, for example of a bitmap for the array) for the encoded version of the block that is written out that indicates (e.g. with a 0 or 1) whether the encoded version of the block that is written out was encoded using the first encoding scheme or the second encoding scheme. Thus, the write control circuitry may be configured to write out metadata (e.g. a bit, for example of a bitmap for the array) for the encoded version of the block that is written out that indicates (e.g. with a 0 or 1) whether the encoded version of the block that is written out was encoded using the first encoding scheme or the second encoding scheme. These embodiments can, for example, facilitate later selection of a suitable scheme for decoding the encoded version of the block that was written out.

The (original unencoded) array of data elements may be provided in any desired and suitable way. For example, embodiments may comprise generating (at least some or all of) the data elements of the array. Thus, the apparatus may comprise data generator circuitry configured to generate (at least some or all of) the data elements of the array. Embodiments may also or instead comprise reading in (at least some or all of) the data elements of the array, e.g. from memory.

The data elements of the array may be generated in any desired and suitable way. For example, generating the data elements of the array may comprise a rendering process. The rendering process may comprise deriving the data values represented by the data elements of the array (e.g. by rasterising primitives to generate graphics fragments and/or by rendering graphics fragments).

A graphics processing pipeline may be used in order to generate the data elements of the array. The graphics processing pipeline may contain any suitable and desired processing stages that graphics pipeline may contain, such as a vertex shader, a rasterisation stage, a rendering stage, etc., in order to generate the data elements of the array.

As will be appreciated, any of the above described encoding processes that are performed in respect of the block of the array of data elements may, in practice, be performed respectively for each (e.g. every) one of plural blocks of the array of data elements.

Thus, the method may comprise:

for each one of plural blocks of the array of data elements, determining whether a data size for an encoded version of that block provided when encoding that block using the first encoding scheme is less than or greater than a threshold size;

when a data size for an encoded version of a block provided when encoding that block using the first encoding scheme is determined to be less than the threshold size, writing out an encoded version of that block that has been encoded using the first encoding scheme; and when a data size for an encoded version of a block provided when encoding that block using the first encoding scheme is determined to be greater than the threshold size, writing out an encoded version of that block that has been encoded using the second encoding scheme.

Similarly, the encoding circuitry may be configured to:

for each one of plural blocks of the array of data elements, determine whether a data size for an encoded version of that block provided when encoding that block using the first encoding scheme is less than or greater than a threshold size; and the write control circuitry may be configured to:

when a data size for an encoded version of a block provided when encoding that block using the first encoding scheme is determined by the encoding circuitry to be less than the threshold size, write out an encoded version of that block that has been encoded using the first encoding scheme; and when a data size for an encoded version of a block provided when encoding that block using the first encoding scheme is determined by the encoding circuitry to be greater than the threshold size, write out an encoded version of that block that has been encoded using the second encoding scheme.

Although the technology described herein has been described above with particular reference to the encoding of a block of an array of data elements, it will be appreciated that the technology described herein also extends to a corresponding decoding process in which a value for a data element of a block that has been encoded in accordance with the technology described herein is determined.

Thus, another embodiment of the technology described herein comprises a method of determining a data value for a data element of an encoded block of an array of data elements, the method comprising:

reading in data for an encoded block of an array of data elements;

determining whether the encoded block was encoded using a first encoding scheme or was encoded using a second encoding scheme, wherein the first encoding scheme provides encoded blocks of non-fixed data size and wherein the second encoding scheme provides encoded blocks of fixed data size;

when the encoded block is determined to have been encoded using the first encoding scheme, using a first decoding scheme that corresponds to the first encoding scheme to determine a data value for a data element of the block; and when the encoded block is determined to have been encoded using the second encoding scheme, using a second scheme that corresponds to the second encoding scheme to determine the data value for the data element of the block.

Another embodiment of the technology described herein comprises a data processing apparatus for determining a data value for a data element of an encoded block of an array of data elements, the apparatus comprising:

read control circuitry configured to:

read in data for an encoded block of an array of data elements; and decoding circuitry configured to:

determine whether the encoded block was encoded using a first encoding scheme or was encoded using a second encoding scheme, wherein the first encoding scheme provides encoded blocks of non-fixed data size and wherein the second encoding scheme provides encoded blocks of fixed data size;

when the encoded block is determined by the decoding circuitry to have been encoded using the first encoding scheme, use a first decoding scheme that corresponds to the first encoding scheme to determine a data value for a data element of the block; and when the encoded block is determined by the decoding circuitry to have been encoded using the second encoding scheme, use a second scheme that corresponds to the second encoding scheme to determine the data value for the data element of the block.

As will be appreciated, these embodiments can, and in some embodiments do, include any one or more or all of the optional features of the technology as described herein in any embodiment, as appropriate.

Thus, for example, embodiments may comprise (e.g. the apparatus or the system) both encoding and writing out a block of an array of data elements in the manner of the technology as described herein in any embodiment, and determining a value for a data element of the block in the manner of the technology as described herein in any embodiment.

Similarly, the first encoding scheme and/or the second encoding scheme may take any desired and suitable form, for example as described herein in any embodiment. Similarly, the (encoded and/or decoded) data value, data element, block of data elements, array of data elements, etc., may take any desired and suitable form or format, for example as described herein in any embodiment.

Determining whether the encoded block was encoded using the first encoding scheme or was encoded using the second encoding scheme may be achieved in any desired and suitable way.

For example, as indicated above, determining whether the encoded version of the block was encoded using the first encoding scheme or the second encoding scheme may comprise using metadata (e.g. a bit, for example of a bitmap for the array) for the encoded version of the block that indicates (e.g. with a 0 or 1) whether the encoded version of the block was encoded using the first encoding scheme or the second encoding scheme. Similarly, when determining whether the encoded version of the block was encoded using the first encoding scheme or the second encoding scheme, the decoding circuitry may be configured to use metadata (e.g. a bit, for example of a bitmap for the array) for the encoded version of the block that indicates (e.g. with a 0 or 1) whether the encoded version of the block was encoded using the first encoding scheme or the second encoding scheme.

In these embodiments, reading in data for the encoded block may comprise reading in metadata (e.g. a bit, for example of a bitmap for the array) for the encoded version of the block that indicates (e.g. with a 0 or 1) whether the encoded version of the block was encoded using the first encoding scheme or the second encoding scheme. Similarly, when reading in data for the encoded block, the read control circuitry may be configured to read in metadata (e.g. a bit, for example of a bitmap for the array) for the encoded version of the block that indicates (e.g. with a 0 or 1) whether the encoded version of the block was encoded using the first encoding scheme or the second encoding scheme.

In other embodiments, determining whether the encoded version of the block was encoded using the first encoding scheme or the second encoding scheme may comprise using the data size of the encoded version of the block. Thus, when determining whether the encoded version of the block was encoded using the first encoding scheme or the second encoding scheme, the decoding circuitry may be configured to use the data size of the encoded version of the block. For example, when the data size of the encoded version of the block is equal to a particular data size, it may be determined that the encoded version of the block was encoded using the second encoding scheme. On the other hand, when the data size of the encoded version of the block is not equal to the particular data size, it may be determined that the encoded version of the block was encoded using the first encoding scheme. These embodiments may accordingly comprise determining the data size of the encoded version of the block. Thus, the decoding circuitry may be configured to determine the data size of the encoded version of the block.

As will be appreciated, the particular data size used to determine whether the encoded version of the block was encoded using the first encoding scheme or the second encoding scheme may be the fixed data size referred to herein in any embodiment.

The first decoding scheme can take any desired and suitable form that corresponds to the first encoding scheme.

For example, as discussed above, the encoded version of the block that has been encoded using the first encoding scheme may comprise a (e.g. lowest) data value for the block and the differences between that data value and corresponding data values for each of the data elements of the block. In these embodiments, using the first decoding scheme may comprise combining (adding) the (e.g. lowest) data value and the relevant difference to determine the data value for the data element of the block. Thus, when using the first decoding scheme, the decoding circuitry may be configured to combine (add) the (e.g. lowest) data value and the relevant difference to determine the data value for the data element of the block.

In embodiments, the data value for the data element of the block that is determined using the first decoding scheme may be used in its decoded (e.g. relatively higher precision) format. Thus, the method may comprise outputting the data value for the data element of the block in its decoded (e.g. relatively higher precision) format. Similarly, the decoding circuitry may be configured to output the data value for the data element of the block in its decoded (e.g. relatively higher precision) format. These embodiments can allow a relatively more precise data value to be used where possible. This may be done, for example, in circumstances (e.g. use of the data value by an output (e.g. display) processor) that can use a particular (relatively higher precision) format for data values, e.g. RGB888 or RGBX8.

However, in other embodiments, the data value for the data element of the block that is determined using the first decoding scheme may be converted to a different (e.g. relatively lower precision) data format, e.g. using the second encoding scheme, for example prior to being output. Thus, the method may comprise converting the data value for the data element of the block that is determined using the first decoding scheme to a different (e.g. relatively lower precision) data format, e.g. using the second encoding scheme. Similarly, the decoding circuitry may be configured to convert the data value for the data element of the block that is determined using the first decoding scheme to a different (e.g. relatively lower precision) data format, e.g. using the second encoding scheme. This may be done, for example, in circumstances (e.g. use of the data value by a graphics processor) that require a particular (e.g. relatively lower precision) format for data values, e.g. RGB565, so as to comply with certain (e.g. API) protocols.

In these embodiments, the second encoding scheme, if used to convert the data value, can take any desired and suitable form as discussed above. Thus, as discussed above, using the second encoding scheme to convert the data value may comprise reducing the number of bits used to represent the data element. Similarly, when using the second encoding scheme to convert the data value, the decoding circuitry may be configured to reduce the number of bits used to represent the data element. Reducing the number of bits may comprise removing or discarding one or more bits of the data element, such as one or more (e.g. the least significant) bits of a or each data value represented by the data element.

As is also discussed above, in embodiments, using the second encoding may further comprise applying dither to the data elements of a block. Thus, using the second encoding scheme to convert the data value may comprise applying dither to the data elements of the decoded block that comprises the data element. Similarly, when using the second encoding scheme to convert the data value, the decoding circuitry may be configured to apply dither to the data elements of the decoded block that comprises the data element. The dither may be applied prior to reducing the number of bits used to represent the data element.

As is also discussed above, the process of applying dither the data elements of the decoded block may comprise applying noise to the data values represented by the data elements of the decoded block, for example so as to randomise quantisation error. These embodiments may, therefore, help to lessen the (e.g. visual) impact that the second encoding scheme may have on the quality (e.g. appearance) of a desired (e.g. graphics) output.

In embodiments, when the encoded block is determined to have been encoded using the second encoding scheme, a second scheme may be used in which the data value for the data element of the block is used in its encoded (e.g. relatively lower precision) format. Thus, the method may comprise outputting the data value for the data element of the block in its encoded (e.g. relatively lower precision) format. Similarly, the decoding circuitry may be configured to output the data value for the data element of the block in its encoded (e.g. relatively lower precision) format. Again, this may be done, for example, in circumstances (e.g. use of the data value by a graphics processor) that require a particular (e.g. relatively lower precision) format for data values, e.g. RGB565, so as to comply with certain (e.g. API) protocols.

In other embodiments, when the encoded block is determined to have been encoded using the second encoding scheme, a second (decoding) scheme that corresponds to the second encoding scheme may be used to determine the data value for the data element of the block. In these other embodiments, the second (decoding) scheme can take any desired and suitable form that corresponds to the second encoding scheme.

In any of the above embodiments, once determined, the data value for the data element of the block may be used in any desired and suitable way.

For example, the data value may be used (e.g. by (e.g. a texture mapper of) a graphics processor) when deriving a further data value. In these embodiments, the array of data elements may correspond to a graphics texture and the data value may correspond to a texel or texels.

For another example, the data value may be outputted (e.g. by an output (e.g. display) processor), e.g. for display. In these embodiments, the array of data elements may correspond to a frame of graphics data and the data value may correspond to a pixel or pixels.

As will be appreciated, any of the above described decoding processes that are performed in respect of a value or element of an encoded block may, in practice, be performed respectively for each (e.g. every) one of plural values or data elements of the encoded block.

Thus, the method may comprise:

when the encoded block is determined to have been encoded using the first encoding scheme, using the first decoding scheme to determine a value or each one of plural values for a data element or each one of plural data elements of the block; and when the encoded block is determined to have been encoded using the second encoding scheme, using the second scheme to determine a value or each one of plural values for a data element or each one of plural data elements of the block.

Similarly, the decoding circuitry may be configured to:

when the encoded block is determined by the decoding circuitry to have been encoded using the first encoding scheme, use the first decoding scheme to determine a value or each one of plural values for a data element or each one of plural data elements of the block; and when the encoded block is determined by the decoding circuitry to have been encoded using the second encoding scheme, use the second scheme to determine a value or each one of plural values for a data element or each one of plural data elements of the block.

Similarly, any of the above described decoding processes that are performed in respect of a block of the array of data elements may, in practice, be performed respectively for each (e.g. every) one of plural encoded blocks of the array of data elements.

Thus, the method may comprise:

reading in data for each one of plural encoded blocks of the array of data elements;

determining whether each of the encoded blocks was encoded using the first encoding scheme or was encoded using the second encoding scheme; and when an encoded block is determined to have been encoded using the first encoding scheme, using the first decoding scheme to determine a value or each one of plural values for a data element or each one of plural data elements of that block;

when an encoded block is determined to have been encoded using the second encoding scheme, using the second scheme to determine a value or each one of plural values for a data element or each one of plural data elements of that block.

Similarly, the read control circuitry may be configured to:

read in data for each one of plural encoded blocks of the array of data elements; and the decoding circuitry may be configured to:

determine whether each of the encoded blocks was encoded using the first encoding scheme or was encoded using the second encoding scheme;

when an encoded block is determined by the decoding circuitry to have been encoded using the first encoding scheme, use the first decoding scheme to determine a value or each one of plural values for a data element or each one of plural data elements of that block; and when an encoded block is determined by the decoding circuitry to have been encoded using the second encoding scheme, use the second scheme to determine a value or each one of plural values for a data element or each one of plural data elements of that block.

The encoding and/or decoding processes described herein in any embodiment may be performed by any desired and suitable apparatus.

For example, the encoding and/or decoding processes described herein in any embodiment may be performed by a graphics processor, a video (codec) processor, and/or an output (e.g. display) processor. The data processing apparatus may therefore comprise one or more of or may be: a graphics processor; a video (codec) processor; and an output (e.g. display) processor. Thus, the encoding circuitry, write control circuitry, read control circuitry and/or decoding circuitry may form part of a graphics processor, a video (codec) processor, or an output (e.g. display) processor. The data processing apparatus may comprise, or may be, or may form part of, a system on chip (SoC).

The memory referred to herein may be any desired and suitable memory of or for the data processing apparatus. The memory may be external to a graphics processor, a video (codec) processor, and/or an output (e.g. display) processor. The memory may be external to the data processing apparatus. The memory may be, for example, main system memory. The encoded block(s) may be written out to, stored in, and/or read in from a texture buffer or frame buffer of the memory.

The technology described herein can be used for all forms of data arrays that a data (e.g. graphics) processing apparatus may provide and/or use, such as frames for display, graphics textures, render to texture outputs, etc. Thus, as indicated above, the array of data elements may comprise graphics data and/or may correspond to a frame or texture of graphics data.

In an embodiment, the various functions of the technology described herein are carried out on a single data (e.g. graphics) processing platform that provides and/or uses the data elements of the array.

As will be appreciated by those skilled in the art, the data processing apparatus of the technology described herein may be part of an overall data (e.g. graphics) processing system that includes, for example, a host (e.g. central) processor. The host processor may, for example, execute applications that require data (e.g. graphics) processing by the data processing apparatus. The host processor may send appropriate commands and data to the data processing apparatus to control it to perform data (e.g. graphics) processing operations and to generate and/or use an (e.g. graphics) output required by applications executing on the host processor. To facilitate this, the host processor may execute a driver for the data processing apparatus and/or may execute a compiler or compilers for compiling (e.g. shader) programs to be executed by a programmable execution unit of the data processing apparatus.

In embodiments, the apparatus or system may comprise, and/or may be in communication with, one or more memories and/or memory devices that store the data described herein, and/or store software for performing the processes described herein. The apparatus or system may comprise, and/or may be in communication with a display for displaying images based on the data elements of the array.

The technology described herein can be implemented in any suitable system, such as a suitably configured computer or micro-processor based system. In an embodiment, the technology described herein is implemented in a computer and/or micro-processor based system.

The various functions of the technology described herein can be carried out in any desired and suitable manner. For example, the steps and functions of the technology described herein can be implemented in hardware or software, as desired. Thus, for example, unless otherwise indicated, the various circuitry, functional elements, stages, and "means" of the technology described herein may comprise a suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner.

The various steps or functions, etc., of the technology described herein may be duplicated and/or carried out in parallel on a given processor. Equally, the various processing stages may share processing circuitry, etc., if desired.

Subject to any hardware necessary to carry out the specific steps or functions, etc., discussed above, the system can otherwise include any one or more or all of the usual functional units, etc., that data (e.g. graphics) processing systems include.

The various data (e.g. graphics) processing stages can accordingly be implemented as desired and in any suitable manner, and can perform any desired and suitable functions, respectively. Similarly, the various data can be defined and stored in any suitable and desired manner.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, embodiments of the technology described herein may comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus, graphics processor, renderer or microprocessor system comprising a data processor causes in conjunction with said data processor said apparatus, processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus embodiments of the technology described herein may comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

As discussed above, embodiments of the technology described herein relate to arrangements that comprise selectively writing out blocks of an array of data elements either that are encoded using a first encoding scheme or that are encoded using a second encoding scheme, wherein the first encoding scheme provides encoded blocks of non-fixed data size and wherein the second encoding scheme provides encoded blocks of fixed data size. Embodiments accordingly provide the potential for an encoded block that is written out to be compressed in a more superior manner using the first encoding scheme where possible, whilst also providing an encoded block that has a predictable maximum compressed size.

Various embodiments of the technology described herein will now be described in the context of the processing of graphics data for display. However, the concepts described herein can equally be applied to contexts in which arrays of other types of data are encoded and/or decoded.

FIG. 1 shows schematically an embodiment of a graphics processing system 100 that can provide data arrays and use data arrays that have been encoded in the manner of the technology described herein.

In this embodiment, the system 100 comprises a graphics processing apparatus in the form of a system on chip (SoC) 102. The system 100 also comprises off-chip (main) memory 116 and a display device 118.

The SoC 102 comprises a central processing unit (CPU) 104, a graphics processing unit (GPU) 106, a video codec 108, a display controller 110, an interconnect 112 and a memory controller 114.

As is shown in FIG. 1, the CPU 104, GPU 106, video codec 108, and display controller 110 communicate with each other via the interconnect 112 and with the memory 116 via the interconnect 112 and memory controller 114. The display controller 110 also communicates with the display device 118.

In the following embodiments, the GPU 106 generates encoded graphics data. The encoded graphics data is then decoded and output, e.g. by the display device 118 for display. In other embodiments, the video codec 108 may encode or decode data and then output that data, e.g. for (e.g. wireless) streaming.

Figure 2:
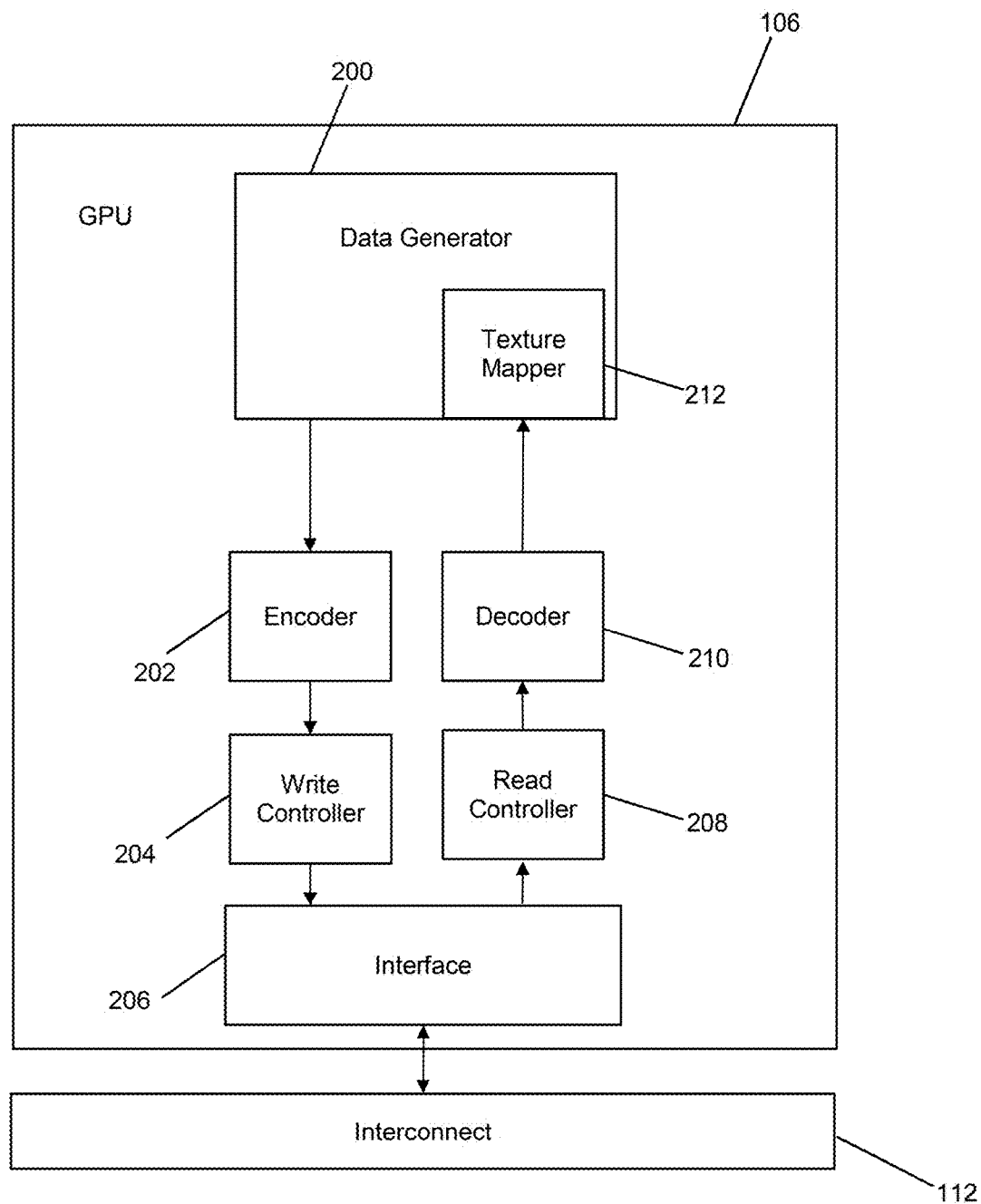
FIG. 2 shows schematically a graphics processor according to an embodiment of the technology described herein.

FIG. 2 shows further details of the GPU 106. In this embodiment, the GPU 106 comprises a data generator 200 that generates frames of graphics data. In this embodiment, the data generator 200 generates graphics data using a graphics processing pipeline. In this embodiment, a frame of graphics data is generated using tile-based rendering, although other forms of rendering could equally be used.

The GPU 106 also comprises an encoder 202 that encodes each tile of graphics data. In doing this, the encoder 202 divides the tile into a plurality of similarly shaped non-overlapping blocks and then encodes each of those blocks separately. The process of encoding a block is described in more detail below. The encoded block of graphics data is then written out to memory 116 by a write controller 204 via an interface 206.

The GPU 106 also comprises a read controller 208 that can read in, via the interface 206, data for a block of an encoded texture from memory 116. The encoded data for the block is then decoded by a decoder 210 before being used by a texture mapper 212 of the data generator 200. The process of determining a value for a data element of an encoded block is described in more detail below.

The graphics processing pipeline and rendering process will now be described in more detail with reference to FIG. 3.

Figure 3:
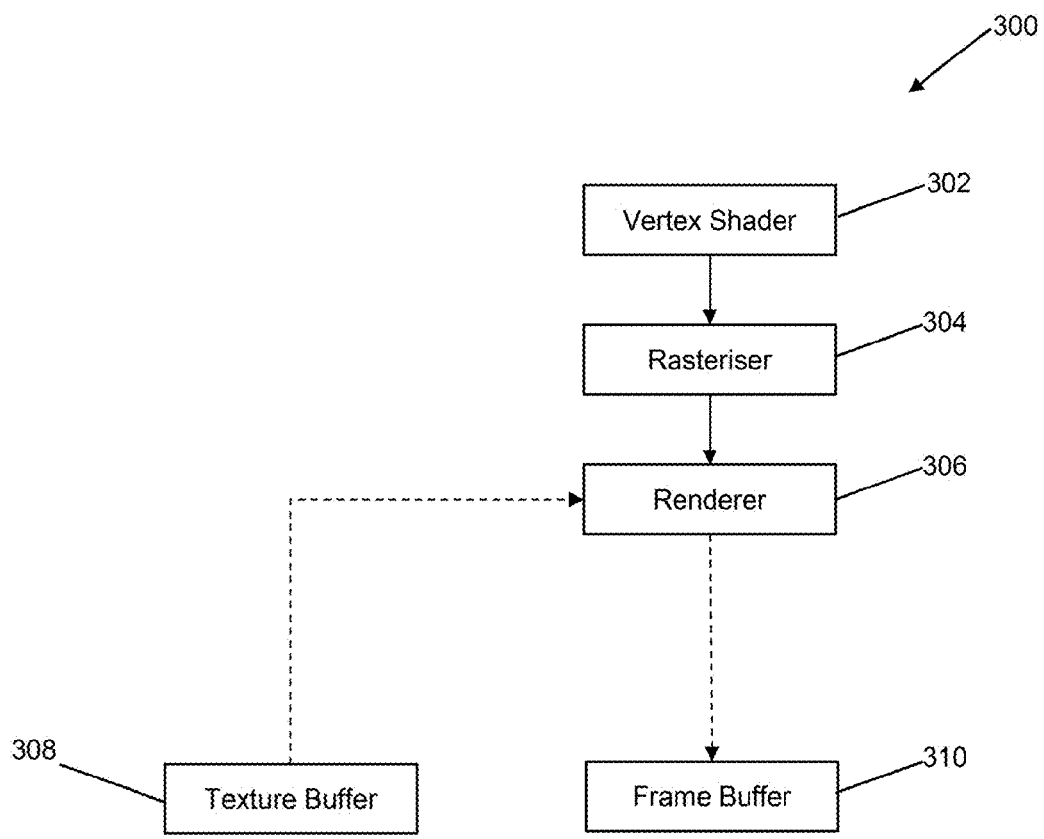
FIG. 3 shows a graphics processing pipeline that can be used in embodiments of the technology described herein.

As is shown in FIG. 3, the pipeline 300 comprises a sequence of different stages, with each stage performing a different operation on "primitives" (e.g. polygons) making up the surfaces of the features of the frame to prepare them for output.

First in the pipeline 300 is a vertex shader 302 which vertex shades the vertices of the primitives for the output being generated. The vertex shader 302 takes input data values associated with the vertices, etc., defined for the output to be generated, and processes those data values to generate a set of vertex shaded attribute data values for use by subsequent stages of the graphics processing pipeline 300.

The rasteriser 304 then operates to rasterise the primitives making up the render output into individual graphics fragments for processing. To do this, the rasteriser 304 receives the graphics primitives for rendering, rasterises the primitives to sampling points and generates graphics fragments representing appropriate sampling positions for rendering the primitives. The fragments generated by the rasteriser 304 are then sent onwards to the rest of the pipeline 300 for processing.

The graphics fragments generated by the rasteriser 304 are then passed to the renderer 306 for shading. The output of the renderer 306 is a set of appropriately shaded, e.g. colour, values for sampling positions for the frame. The output of the renderer 306 is then stored in a frame buffer 310 of the memory 116.

The renderer 306 includes a number of different processing units, such as a fragment shader, blender, texture mapper 212, etc. In particular, as shown in FIG. 3, the renderer 306 will, inter alia, access textures stored in a texture buffer 308 that is accessible to the GPU 106, so as to be able to apply the relevant texture to fragments that it is rendering. The memory where the texture buffer 308 resides may be on chip or in external memory (e.g. memory 116) that is accessible to the GPU 106.

The GPU 106 uses the decoding arrangements of the embodiments described herein in respect of the stored textures in the texture buffer 308. Thus, when the renderer 306 needs to access a texture value, the texture buffer 308 will be read by the read controller 208 and decoded by the decoder 210 in the manner described herein.

The GPU 106 also uses the encoding arrangements of the embodiments described herein in respect of output data to be stored in the frame buffer 310. Thus, when the generated output data from the GPU 106 is written out to the frame buffer 310, that data is encoded by the encoder 202 and then written to the frame buffer 310 by the write controller 204 in the manner described herein.

This output data can then be read from the frame buffer 310 and decoded in the manner described herein, e.g., by the display controller 110 for the display device 118 on which the frame is to be displayed. Thus, in this embodiment, the display controller 110 comprises a read controller and decoder similar to those of the GPU 106. In other embodiments, the video codec 108 may comprise a read controller and decoder and/or write controller and encoder similar to those of the GPU 106.

Other arrangements for the data processing system 100 would, of course, be possible.

A process of encoding a block of an array of data elements, such as a texture or frame of graphics data, will now be described in more detail with reference to FIGS. 4A-4C and FIG. 5.

Figure 4A:
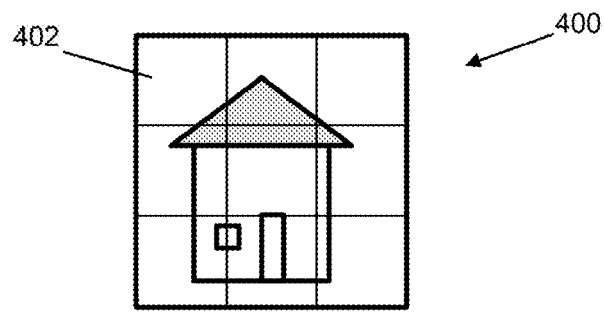
FIG. 4A shows an array of data elements divided into blocks to be encoded according to embodiments of the technology described herein.

Referring initially to FIG. 4A, in this embodiment, an array of data elements 400 for a frame or texture of graphics data is divided into plural blocks 402. In this embodiment, each data element has an RGBX8 format. Thus, each data element comprises an 8-bit red (R) data value, an 8-bit green (G) data value, an 8-bit blue (B) data value and an 8-bit transparency (α) data value, giving 32 bits in total per data element. Other data element formats could of course be used as desired.

FIG. 4A, shows nine relatively larger blocks 402. However, other numbers of blocks and block sizes could of course be used as desired. For example, in embodiments, each block is 4×4 data elements in size. In these embodiments, the size of each block is therefore 64 bytes (i.e. 4×4×32/8).

Figure 5:
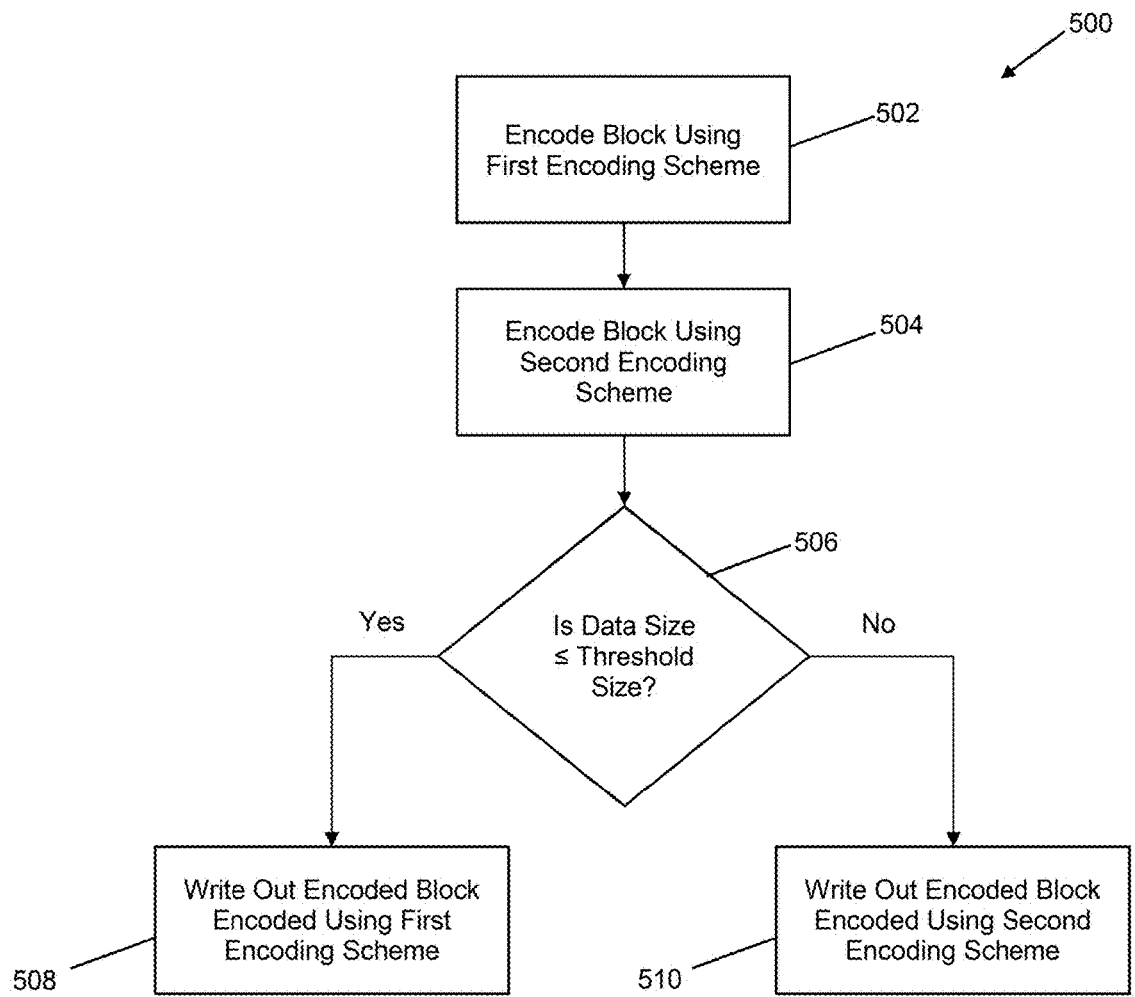
FIG. 5 shows a method of encoding a block of an array of data elements according to an embodiment of the technology described herein.

Referring now to the process 500 shown in FIG. 5, in step 502, each block in question is initially encoded using a first encoding scheme.

In this embodiment, the first encoding scheme is a lossless entropy encoding scheme that comprises, inter alia, determining the lowest data value for each type of data value (i.e. for each of R, G, B or α) represented by the data elements of the block and then determining the differences between that data value and the data values of that type in respect of each of the data elements of the block. The encoded version of the block that has been encoded using the first encoding scheme therefore comprises, for each type of data value, a lowest data value and a set of differences.

Further details of a suitable encoding scheme for step 502 can be found, for example, in US 2013/0034309 or US 2013-0195352, the entire contents of which are incorporated herein by reference. Other first encoding schemes could of course be used as desired.

Then, in step 504, each block in question is also encoded using a second encoding scheme. In this embodiment, the second encoding scheme is a lossy encoding scheme.

To try to alleviate the negative impact of the lossy encoding scheme on the desired output, in this embodiment the second encoding scheme initially comprises applying dither (i.e. noise) to the block. This has the effect of randomising the quantisation error.

The second encoding scheme then comprises converting each data element of the dithered block into an RGB565 format by removing the 3 least significant bits of the red data value to give a 5-bit red data value, removing the 2 least significant bits of the green data value to give a 6-bit green data value, removing the 3 least significant bits of the blue data value to give a 5-bit blue data value, and discarding all 8 bits of the transparency data value, giving 16 bits in total per data element. Other second encoding schemes could of course be used as desired.

The fixed data size of each block encoded using the second encoding scheme is accordingly 32 bytes (i.e. 4×4× 16/8). In this embodiment, this fixed data size (32 bytes) is used in step 506 as a threshold size for deciding whether to write out an encoded version of the block to memory that has been encoded using the first encoding scheme or that has been encoded using the second encoding scheme.

In particular, if the encoded version of the block that has been encoded using the first encoding scheme is less than or equal to the threshold size (32 bytes), then in step 508 the encoded version of the block that has been encoded using the first encoding scheme is written out to memory 116. This provides the opportunity for a highly compressed and losslessly encoded version of the block to be written out to memory, if possible, thereby potentially reducing memory and bandwidth usage without losing precision.

Figure 4B:
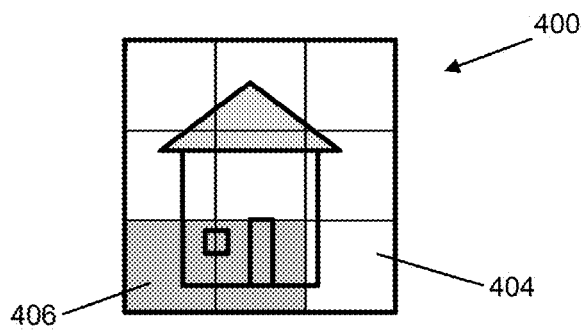
FIG. 4B shows blocks of an array of data elements encoded according to embodiments of the technology described herein.

FIG. 4B shows seven blocks 404 that are determined as being less than or equal to the threshold size when encoded using the first encoding scheme (these blocks 404 are un-shaded in FIG. 4B). It should be noted that these blocks 404 are relatively less varied in detail, and accordingly compress well using the first encoding scheme. Encoded versions of these blocks that have been encoded using the first encoding scheme are accordingly written out to memory 116.

Referring again to FIG. 5, if the encoded version of the block that has been encoded using the first encoding scheme is greater than the threshold size (32 bytes), then in step 510 the encoded version of the block that has been encoded using the second encoding scheme is written out to memory 116. This provides a guaranteed maximum data size (32 bytes) for the encoded blocks that are written out. This in turn can lead to predictable maximum bandwidth and memory consumption and can significantly simplify bandwidth and memory management.

FIG. 4B shows two blocks 406 that are determined as being greater than the threshold size when encoded using the first encoding scheme (these blocks 406 are shaded in FIG. 4B). It should be noted that these blocks 406 comprise relatively more varied detail, and accordingly do not compress as well using the first encoding scheme. Encoded versions of these blocks that have been encoded using the second encoding scheme are accordingly written out to memory 116. However, given that these blocks 406 are relatively more varied in detail (and, e.g., that dither has been applied), the fact that they are encoded using the lossy second encoding scheme is likely to be less noticeable.

Referring again to FIG. 5, in this embodiment, steps 508 and 510 further comprise writing out metadata for the encoded block in the form of a bit that indicates, with a 0, that the encoded version of the block that is written out was encoded using the first encoding scheme or, with a 1, that the encoded version of the block that is written out was encoded using the second encoding scheme. As will be discussed in more detail below, this metadata can facilitate later selection of a suitable scheme for decoding an encoded version of a block.

As will be appreciated, the process 500 is repeated for each block that is to be encoded.

Figure 4C:
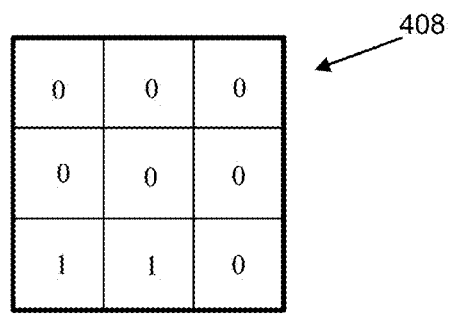
FIG. 4C shows metadata for blocks of an array of data elements encoded according to embodiments of the technology described herein.

FIG. 4C then shows the metadata for the encoded blocks of the array in the form of a bitmap 408.

A number of modifications and variations to the above described process 500 are possible.

For example, step 504 may be performed at substantially the same time as step 502 such that the encoded version of the block that is generated using the second encoding scheme is generated substantially at the same time as generating the encoded version of the block using the first encoding scheme. This can, for example, make use of data that is readily available (e.g. cached) when generating the encoded versions of blocks using the second encoding scheme.

For another example, step 504 may be moved so as to be after step 506 and before step 510 such that the encoded version of the block that is generated using the second encoding scheme is generated only once the data size is determined to be greater than the threshold size. This can, for example, avoid the need to generate an encoded version of the block using the second encoding scheme in step 504 unless that encoded version is required.

For yet another example, step 502 may also be moved so as to be after step 506 and before step 508 such that the encoded version of the block that is generated using the first encoding scheme is generated only once the data size is determined to be less than or equal to the threshold size. This example may comprise predicting the data size of the encoded version of the block that would be generated using the first encoding scheme. This can, for example, avoid the need to generate an encoded version of the block using the first encoding scheme in step 502 unless that encoded version is required.

For yet another example, steps 508 and 510 need not comprise writing out metadata for the encoded version of the block. In these embodiments, as will be discussed in more detail below, other techniques can be used to determine whether the encoded version of the block was encoded using the first encoding scheme or the second encoding scheme.

Figure 6:
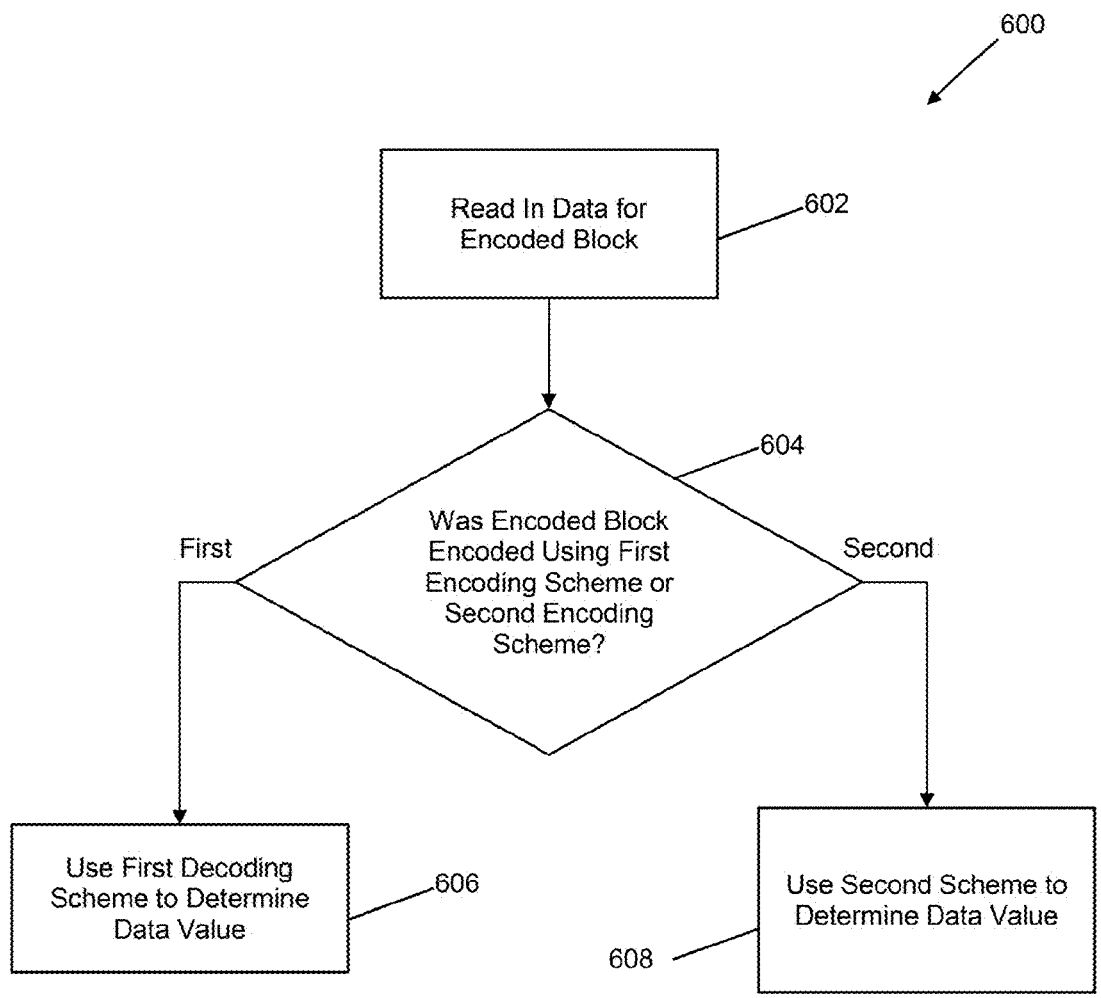
FIG. 6 shows a method of determining a data value for a data element of an encoded block of an array of data elements according to an embodiment of the technology described herein.

A process 600 of determining a data value for a data element of an encoded block of an array of data elements, such as an encoded texture or frame of graphics data, will now be described in more detail with reference to FIG. 6.

In this embodiment, the encoded block has previously been encoded and written out to memory according to the process 500 of FIG. 5.

In step 602, data for the encoded block is read from memory. In this embodiment, this comprises reading metadata that indicates, with a 0 or 1, whether the encoded block was encoded using the first encoding scheme or the second encoding scheme.

The metadata is then used in step 604 to determine whether the encoded block was encoded using the first encoding scheme or the second encoding scheme.

If the encoded block was encoded using the first encoding scheme then, in step 606, the data value is determined using a first decoding scheme that corresponds to the first encoding scheme. In this embodiment, this comprises adding together the relevant lowest data value and the relevant difference (which difference may be zero if the required data value is the lowest data value) to determine the data value for the data element of the block.

If the encoded block was encoded using the second encoding scheme then, in step 608, the data value is determined either using a second scheme in which the data value is used in its encoded (lower precision) format or using a second decoding scheme that corresponds to the second encoding scheme (if decoding is needed).

As will be appreciated, step 606 or step 608 is repeated for each data value that is to be determined for the block. The process 600 is also repeated for each block for which a data value is to be determined.

The determined data value can then be used as desired. For example, as discussed above, the determined data value may be a texture value that is used by the GPU to determine a further (e.g. colour) data value. Alternatively, the determined data value may be a pixel value that is output, e.g. by the display controller for display.

A number of modifications and variations to the above described process 600 are possible.

For example, rather than using metadata for the encoded block, step 604 may comprise using the data size of the encoded block to determine whether the encoded block was encoded using the first encoding scheme or the second encoding scheme. In this example, when the data size is the size of an encoded block that has been encoded using the second encoding scheme, e.g. 32 bytes, then it can be determined that the encoded block was encoded using the second encoding scheme. On the other hand, when the data size is not the size of an encoded block that has been encoded using the second encoding scheme, then it can be determined that the encoded block was encoded using the first encoding scheme.

For another example, a further step may be performed after step 606 in which the determined data value is converted to a lower precision format (e.g. RGB565), for example using the second encoding scheme discussed above. This may be done, for example, when the data value is to be used by the graphics processor so as to comply with certain API protocols.

It can be seen from the above that embodiments of the technology described herein can allow blocks of an array of data elements that are written out to be compressed in a variable manner where possible but also allows the blocks of the array of data elements that are written out to have a predictable maximum compressed block size. This can lead to predictable maximum bandwidth and memory consumption and can significantly simplify bandwidth and memory management. This is achieved in embodiments of the technology described herein by selectively writing out blocks of an array of data elements either that are encoded using a first encoding scheme or that are encoded using a second encoding scheme, wherein the first encoding scheme provides encoded blocks of non-fixed data size and wherein the second encoding scheme provides encoded blocks of fixed data size.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of encoding an array of data elements and determining a data value for a data element of an encoded block of an array of data elements in a graphics processing system, the method comprising:
   for a block of an array of data elements, determining whether a data size for an encoded version of the block provided when encoding the block using a first encoding scheme is less than or greater than a threshold size;
   when the data size for the encoded version of the block is determined to be less than the threshold size, writing out an encoded version of the block that has been encoded using the first encoding scheme;
   when the data size for the encoded version of the block is determined to be greater than the threshold size, writing out an encoded version of the block that has been encoded using a second encoding scheme;
   wherein:
   the first encoding scheme provides encoded blocks of non-fixed data size, wherein the second encoding scheme provides encoded blocks of fixed data size, and wherein the second encoding scheme comprises converting the data elements of the block to a different data format;
   the method further comprising:
   reading in data for an encoded block of an array of data elements;
   determining whether the encoded block was encoded using the first encoding scheme or was encoded using the second encoding scheme;
   when the encoded block is determined to have been encoded using the first encoding scheme, using a first decoding scheme that corresponds to the first encoding scheme to determine a data value for a data element of the block, and converting the data value for the data element of the block that is determined using the first decoding scheme to the different data format using the second encoding scheme; and when the encoded block is determined to have been encoded using the second encoding scheme, using a second scheme that corresponds to the second encoding scheme to determine the data value for the data element of the block.

2. A method as claimed in claim 1, wherein the first encoding scheme is substantially lossless and the second encoding scheme is lossy.

3. A method as claimed in claim 1, wherein the first encoding scheme has the potential to compress a block to a greater extent than the second encoding scheme.

4. A method as claimed in claim 1, wherein the threshold size is substantially the size of an encoded version of a block provided when encoding a block using the second encoding scheme.

5. A method as claimed in claim 1, wherein determining whether the data size is less than or greater than the threshold size comprises generating the encoded version of the block using the first encoding scheme and then comparing the data size of that encoded version of the block to the threshold size.

6. A method as claimed in claim 1, wherein using the second encoding scheme comprises applying dither to the data elements of the block.

7. A method as claimed in claim 1, further comprising writing out metadata for the encoded version of the block that is written out that indicates whether the encoded version of the block that is written out was encoded using the first encoding scheme or the second encoding scheme.

8. A data processing apparatus for encoding an array of data elements and determining a data value for a data element of an encoded block of an array of data elements, the apparatus comprising:
  encoding circuitry configured to:
    for a block of an array of data elements, determine whether a data size for an encoded version of the block provided when encoding the block using a first encoding scheme is less than or greater than a threshold size;
  write control circuitry configured to:
    when the data size for the encoded version of the block is determined by the encoding circuitry to be less than the threshold size, write out an encoded version of the block that has been encoded using the first encoding scheme; and
    when the data size for the encoded version of the block is determined by the encoding circuitry to be greater than the threshold size, write out an encoded version of the block that has been encoded using a second encoding scheme;
  wherein the first encoding scheme provides encoded blocks of non-fixed data size, wherein the second encoding scheme provides encoded blocks of fixed data size, and wherein the second encoding scheme comprises converting the data elements of the block to a different data format;
  read control circuitry configured to:
    read in data for an encoded block of an array of data elements; and decoding circuitry configured to:
    determine whether the encoded block was encoded using the first encoding scheme or was encoded using the second encoding scheme;
    when the encoded block is determined by the encoding circuitry to have been encoded using the first encoding scheme, use a first decoding scheme that corresponds to the first encoding scheme to determine a data vale for a data element of the block, and convert the data value for the data element of the block that is determined using the first decoding scheme to the different data format using the second encoding scheme; and
    when the encoded block is determined by the decoding circuitry to have been encoded using the second encoding scheme, use a second scheme that corresponds to the second encoding scheme to determine the data value for the data element of the block.

9. An apparatus as claimed in claim 8, wherein the first encoding scheme is substantially lossless and the second encoding scheme is lossy.

10. An apparatus as claimed in claim 8, wherein the first encoding scheme has the potential to compress a block to a greater extent than the second encoding scheme.

11. An apparatus as claimed in claim 8, wherein the threshold size is substantially the size of an encoded version of a block provided when encoding a block using the second encoding scheme.

12. An apparatus as claimed in claim 8, wherein, when determining whether the data size is less than or greater than the threshold size, the encoding circuitry is configured to generate the encoded version of the block using the first encoding scheme and then compare the data size of that encoded version of the block to the threshold size.

13. An apparatus as claimed in claim 8, wherein, when using the second encoding scheme, the encoding circuitry is configured to apply dither to the data elements of the block.

14. An apparatus as claimed in claim 8, wherein the write control circuitry is further configured to write out metadata for the encoded version of the block that is written out that indicates whether the encoded version of the block that is written out was encoded using the first encoding scheme or the second encoding scheme.

15. An apparatus as claimed in claim 8, wherein, when determining whether the encoded version of the block was encoded using the first encoding scheme or the second encoding scheme, the decoding circuitry is configured to use metadata for the encoded version of the block that indicates whether the encoded version of the block was encoded using the first encoding scheme or the second encoding scheme.

16. An apparatus as claimed in claim 8, wherein, when determining whether the encoded version of the block was encoded using the first encoding scheme or the second encoding scheme, the decoding circuitry is configured to use the data size of the encoded version of the block.

17. An apparatus as claimed in claim 8, wherein the different data format comprises a relatively lower precision format.

18. A non-transitory computer readable storage medium storing computer software code which when executing on a processor of a data processing apparatus performs a method of encoding an array of data elements and determining a data value for a data element of an encoded block of an array of data elements, the method comprising:
  for a block of an array of data elements, determining whether a data size for an encoded version of the block provided when encoding the block using a first encoding scheme is less than or greater than a threshold size;
  when the data size for the encoded version of the block is determined to be less than the threshold size, writing out an encoded version of the block that has been encoded using the first encoding scheme;
  when the data size for the encoded version of the block is determined to be greater than the threshold size, writing out an encoded version of the block that has been encoded using a second encoding scheme;
  wherein:
  the first encoding scheme provides encoded blocks of non-fixed data size, wherein the second encoding scheme provides encoded blocks of fixed data size, and wherein the second encoding scheme comprises converting the data elements of the block to a different data format;

the method further comprising:

reading in data for an encoded block of an array of data elements;

determining whether the encoded block was encoded using the first encoding scheme or was encoded using the second encoding scheme;

when the encoded block is determined to have been encoded using the first encoding scheme, using a first decoding scheme that corresponds to the first encoding scheme to determine a data value for a data element of the block, and converting the data value for the data element of the block that is determined using the first decoding scheme to the different data format using the second encoding scheme; and when the encoded block is determined to have been encoded using the second encoding scheme, using a second scheme that corresponds to the second encoding scheme to determine the data value for the data element of the block.

* * * * *

UNITED STATES PATENT AND TRADEMARK OFFICE
CERTIFICATE OF CORRECTION

PATENT NO. : 10,395,394 B2
APPLICATION NO. : 15/610016
DATED : August 27, 2019
INVENTOR(S) : L. Flordal et al.

It is certified that error appears in the above-identified patent and that said Letters Patent is hereby corrected as shown below:

In the Claims

Column 23, Line 59 (Claim 8, Line 38), please change "vale" to --value--.

Signed and Sealed this
Twenty-first Day of July, 2020

Andrei Iancu
*Director of the United States Patent and Trademark Office*